No. 759,313. Patented May 10, 1904.

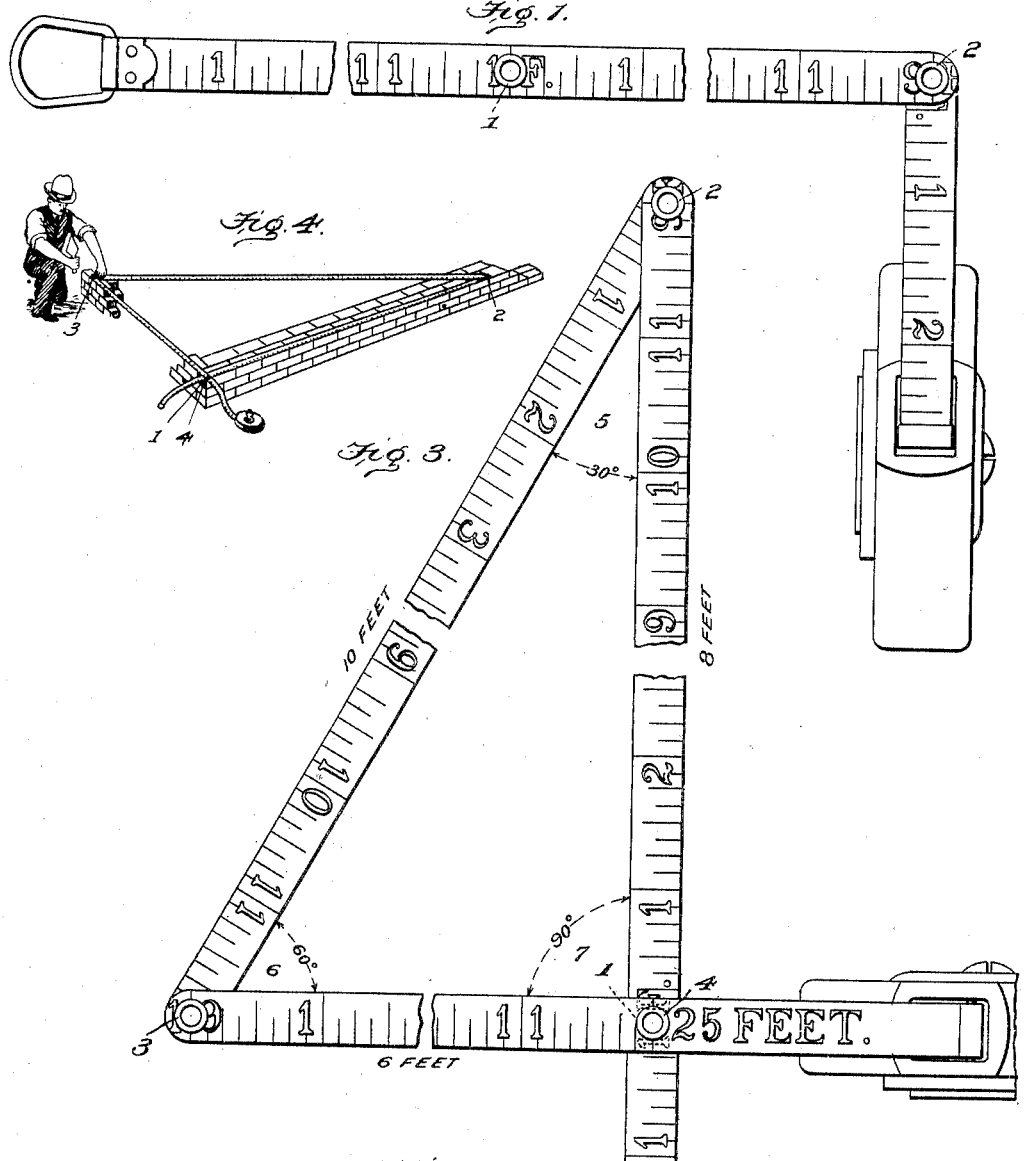

UNITED STATES PATENT OFFICE.

JAMES AUSTIN ROE, OF PATCHOGUE, NEW YORK.

ANGLE TAPE-MEASURE.

SPECIFICATION forming part of Letters Patent No. 759,313, dated May 10, 1904.

Application filed January 18, 1904. Serial No. 189,510. (No model.)

*To all whom it may concern:*

Be it known that I, JAMES AUSTIN ROE, a citizen of the United States, residing at Patchogue, in the county of Suffolk and State of New York, have invented certain new and useful Improvements in Angle Tape-Measures; and I do hereby declare the following to be a full, clear, and exact description of the invention, such as will enable others skilled in the art to which it appertains to make and use the same.

My invention is directed to the production of a case-inclosed tape measure or band adapted for taking or laying off angles of foundations, and is particularly designed for use by contractors, masons, builders, and other trades or professions for securing angles of different kinds quickly and accurately.

The invention which constitutes the subject-matter of this patent resides in constructing a tape-measure with lap-joints at certain points having holes at the joints and reinforced holes at the starting and terminal ends, whereby the tape-measure is secured as it is laid to the foundation by nails driven through the holes at the angles formed at the lap-joints and at the starting and terminal ends, thus enabling one person to form and to position the angles by nailing the tape at the starting foot-point at the angles and connecting it at the finishing foot-point with the starting-hole, whereby the tape is applied by nails which pass through said joint-eyelets and which connect the ends of the tape in forming a triangle having angles of different degrees.

The accompanying drawings show in Figure 1 a tape-measure case provided with my improved angle tape-measure partially withdrawn to illustrate the use of the jointed perforated tape in forming angles of certain degrees. Fig. 2 shows the two end portions of the tape-measure, illustrating its rivet lap-jointed eyelet-sections and the foot-marks at each end of the tape, whereby the tape is formed into angles and nailed to the foundation at the different angles and holes in bringing together these foot-marks. Fig. 3 shows the lap-jointed tape set to form angles of ninety, sixty, and thirty degrees. Fig. 4 shows in perspective the manner of laying and nailing the tape-measure by its eyelets and holes in forming the angles of the foundation.

As an article of manufacture the tape measure or band is reeled in the usual way in a case or reel. The tape or band is of steel ribbon or of any other suitable tape material and is graduated in the usual way for straight measuring. For a twenty-five-foot measure my improvement is applied thereto so that the tape may be formed into angles of ninety, sixty, and thirty degrees. The end of the tape is provided with the usual pull-link and from which the foot-graduations commence. At the end of the first foot the tape has a riveted eyelet 1 to form the first foot-mark or nailed starting-point, and at the end of the ninth foot the tape is broken and is lap-jointed by a riveted eyelet 2 to form the first angle-point, so that the tape may be swung flatwise at this eyelet-joint to form an angle at the ninth foot. At the end of the nineteenth foot the tape is broken and is lap-jointed by a riveted eyelet 3, at which point the tape may be swung or turned flatwise on the eyelet-joint to form an angle at the nineteenth foot, while at the end of the twenty-fifth foot the tape is provided with a nonjointed eyelet 4, and it is by these end foot-marks and intermediate jointed angle-points and the perforations at these points that angles of different degrees may be formed.

To the builder the manner of using the perforated and jointed tape-measure shown in the drawings is obvious; but looking at Fig. 4 it is seen that the tape is nailed by its starting-hole 1 to the foundation, around and upon which it is laid and to which it is also nailed at each angle-bend and its terminal eyelet connected to the nail at the starting-point. This handling of the tape is by a single person, who then finishes the squaring by pulling the tape at the joint designated at the nineteenth foot-eyelet to locate the proper point to put the brick in order to have it a true right angle to the foundation. I prefer to joint the tape-sections by riveted eyelets, because they form the nail-holes and give strength to the tape at the holes against the strain upon the fastening-nails and because they maintain a true and durable lap-joint and to allow an easy and smooth drawing in and winding the tape within the case, but reserve the right to use any other suitable means for making said lap-joint provided with the holes.

Obviously tapes can be eyelet-jointed at any desired distances to form different angles for special uses and for different classes of trade and which may require tapes of greater or less length; but in any length the tape must be formed with the starting and terminal eyelet foot-marks. In winding the tape the sections will stand straight and move into and through the opening in the case as if it had no joints. The foot-indicating eyelets, however, should be distinctive. The connection of the lap-jointed ends have a pivotal flexure, and for this reason such a connection will entail no loss of measure at the bends when adapted for any special work and for any kind of angle or angles, as seen in Fig. 3, wherein an angle of thirty degrees is seen at 5, an angle of sixty degrees is seen at 6, and an angle of ninety degrees is seen at 7; but for special purposes such a measure may be formed for laying out any number of angles.

I claim—

1. A device of the character described, comprising a tape-measure or band formed of sections of unequal lengths connected by lap-joints provided with eyelets for pivots and having at or near its ends marks with eyelets, whereby the measure is applied by nailing it at the joints and at the said perforated marks to form a triangle having angles of different degrees.

2. A device of the character described, comprising a tape-measure or band formed of sections of unequal lengths, connected by lap-joints having eyelets as pivots, and having starting and terminal eyelets whereby the tape is applied by nails driven through said eyelets for connecting the ends of the tape in forming the triangle.

3. As a new article of manufacture a tape-measure comprising a winding case or reel having a measuring-tape of sections of unequal lengths, lap-jointed, having eyelets as pivots at the joints and provided with eyelets at or near each end whereby the tape may be nailed to the work to form a triangle having angles of different degrees.

In testimony whereof I have signed my name to this specification in the presence of two subscribing witnesses.

JAMES AUSTIN ROE.

Witnesses:
C. FREMONT HOWELL,
SYLVESTER McCANN.